United States Patent
Boyle

(10) Patent No.: US 7,424,316 B1
(45) Date of Patent: Sep. 9, 2008

(54) BODY-WORN PERSONAL COMMUNICATIONS APPARATUS

(75) Inventor: Kevin R. Boyle, Horsham (GB)

(73) Assignee: NXP B.V., Eindhoven (NL)

( * ) Notice: Subject to any disclaimer, the term of this patent is extended or adjusted under 35 U.S.C. 154(b) by 1255 days.

(21) Appl. No.: 09/616,635

(22) Filed: Jul. 26, 2000

(30) Foreign Application Priority Data

Jul. 29, 1999 (GB) ................. 9917678.6

(51) Int. Cl.
*H04M 1/00* (2006.01)
(52) U.S. Cl. ............. 455/575.7; 455/575.1; 455/90.3; 368/10; 368/47; 368/88; 368/278; 343/700 MS; 343/702; 343/718; 379/433.11; 340/7.63
(58) Field of Classification Search ... 455/575.1–575.7, 455/269, 344, 351, 66.1, 90.1–90.3, 550.1; 343/702, 718, 720; 368/47, 281, 4, 13, 10; 340/7.63; 379/433.11
See application file for complete search history.

(56) References Cited

U.S. PATENT DOCUMENTS

| | | | | |
|---|---|---|---|---|
| 4,769,656 A | * | 9/1988 | Dickey .................. 343/718 |
| 4,847,818 A | * | 7/1989 | Olsen .................... 368/10 |
| 4,884,252 A | * | 11/1989 | Teodoridis et al. .......... 368/10 |
| 4,947,179 A | * | 8/1990 | Ganter et al. .............. 343/718 |
| 5,008,864 A | * | 4/1991 | Yoshitake ................ 368/10 |
| 5,054,051 A | * | 10/1991 | Hoff ..................... 455/556.1 |
| 5,134,724 A | * | 7/1992 | Gehring et al. ............ 455/274 |
| 5,179,733 A | * | 1/1993 | Matsui .................. 455/344 |
| 5,239,521 A | | 8/1993 | Blonder .................. 368/10 |
| 5,265,265 A | * | 11/1993 | Hama et al. ............. 455/300 |
| 5,450,091 A | * | 9/1995 | Hama ................... 343/718 |
| 5,467,324 A | * | 11/1995 | Houlihan ................ 368/10 |
| 5,517,676 A | * | 5/1996 | Sekine et al. ............ 455/575.5 |
| 5,526,006 A | * | 6/1996 | Akahane et al. .......... 343/718 |
| 5,532,705 A | * | 7/1996 | Hama ................... 343/718 |
| 5,541,610 A | * | 7/1996 | Imanishi et al. .......... 343/702 |
| 5,659,611 A | | 8/1997 | Saksa .................... 379/433 |

(Continued)

FOREIGN PATENT DOCUMENTS

GB     2036447 A    *   6/1980

(Continued)

OTHER PUBLICATIONS

By K. Fuijimoto and J. R. James, Mobile Antenna System Handbook, Artech House, 1994, pp. 178-181.

(Continued)

*Primary Examiner*—Sharad Rampuria
(74) *Attorney, Agent, or Firm*—Peter Zawilski

(57) ABSTRACT

In a body-worn personal communications apparatus, for example a wrist-carried wireless telephone, an antenna (102) is a helical or other physically-shortened electric antenna that makes use of the enhanced normal component of electric field close to the body. A microphone (114) can act as a top load to the antenna, thereby enabling the use of a shorter antenna. The antenna (102) may be formed from coaxial cable, enabling it to provide electrical connections between the microphone (114) and transceiver circuitry in the body of the apparatus. By arranging for the microphone (114) to have low impedance at radio frequencies, the coaxial cable acts as an inductive stub and enables the antenna (102) to be further shortened.

14 Claims, 2 Drawing Sheets

U.S. PATENT DOCUMENTS

| | | | | |
|---|---|---|---|---|
| 5,699,319 | A | * | 12/1997 | Skrivervik .................... 368/10 |
| 5,737,699 | A | * | 4/1998 | Farrar et al. ................. 455/344 |
| 5,768,217 | A | * | 6/1998 | Sonoda et al. ................ 368/10 |
| 5,798,984 | A | * | 8/1998 | Koch .......................... 368/10 |
| 5,889,737 | A | * | 3/1999 | Alameh et al. .............. 368/204 |
| 5,892,483 | A | * | 4/1999 | Hayes et al. ................. 343/729 |
| 5,926,144 | A | * | 7/1999 | Bolanos et al. ............. 343/718 |
| 6,028,556 | A | * | 2/2000 | Shiraki .................... 455/575.7 |
| 6,192,253 | B1 | * | 2/2001 | Charlier et al. ............. 455/550 |
| 6,429,829 | B1 | * | 8/2002 | Hirai et al. ................. 343/895 |

FOREIGN PATENT DOCUMENTS

| | | | | |
|---|---|---|---|---|
| GB | 2036447 | A | * | 6/1980 |
| GB | 2036447 | A | | 6/1980 |
| JP | 08162820 | | * | 6/1996 |
| JP | 11177328 | A | * | 7/1999 |
| WO | WO9827702 | | | 6/1998 |
| WO | WO-00/13329 | | * | 3/2000 |
| WO | WO0013329 | | | 3/2000 |

OTHER PUBLICATIONS

By K. Siwiak, Radioware Propagation and Antennas for Personal Communication, Second Edition, Artech House, 1998, pp. 209-211.
Patent Abstracts of Japan, JP 10229357 A Publication Date Aug. 25, 1998, Application No. 09343395, Application Date Dec. 12, 1997. (Nippon Telegr & Amp;Teleph Corp & LT;NTT>), Abstract; Figure 21.

* cited by examiner

BODY-WORN PERSONAL COMMUNICATIONS APPARATUS

BACKGROUND OF THE INVENTION

1. Field of the Invention

The present invention relates to a body-worn personal communications apparatus, for example a wrist-carried wireless telephone.

2. Description of the Related Art

Wireless telephones are generally available either with microphones and loudspeakers built into the main body of the phone, which is then hand-held in a conventional manner, or with headsets which enable the user to operate in a hands-free manner. Progress in miniaturization of electronic components has enabled the production of body-worn personal wireless telephones, which have the advantage of being more convenient to carry and operate than a separate hand-held telephone. The most common example of such a device is a combined wristwatch and wireless telephone, but wireless telephones may also be incorporated in other body-worn goods, for example pendants.

Other types of body-worn personal communications devices include those providing wireless connectivity. An example of such a device is a wristwatch communicator operating according to the Bluetooth specification, which is aimed at short range ad-hoc data and voice wireless communications in both stationary and mobile communication environments. Communication takes place in the unlicensed ISM band at around 2.45 GHz. A wristwatch communicator could, for example, function as a user interface to an existing mobile phone, with communication between phone and wristwatch using a Bluetooth link.

A particular problem in the design of wrist-carried communicators is to provide an antenna which is efficient (to maximise battery life), compact (to avoid increasing the bulk of the device) and robust. A great deal of work has been performed in this area. The same problem occurs with other body-worn personal communications devices.

In a wrist-carried communicator the most common arrangement is to incorporate a magnetic loop antenna into the wristwatch strap, although this approach has to overcome the problems caused by varying wrist sizes and the joins between the strap and watch case and between the two ends of the strap. An example of a strap loop antenna is disclosed in U.S. Pat. No. 5,450,091 in which the capacitance between the overlapping strap ends is varied when the wristwatch is worn by users having different wrist sizes, thereby compensating for the change in loop dimensions. Such a design is difficult to make mechanically robust and reliable particularly where the strap is joined to the case. Further, it cannot be used with alternative body-worn transceivers which do not have a strap or equivalent structure into which to incorporate the antenna.

To overcome problems of robustness, attempts have been made to incorporate antennas into the watch casing itself. For example, U.S. Pat. No. 5,737,699 discloses a magnetic loop antenna formed within a watch casing. However, the need to accommodate the watch mechanism and transceiver circuitry in the casing complicates the design of the loop antenna and the assembly of the wristwatch telephone.

A number of other antenna designs for mounting inside a watch casing have been proposed, but all suffer from significant problems. Conformal dipoles can be compact but, because of their conformal nature, receive the component of the electric field parallel to the body which is significantly reduced by the presence of the body. Patch antennas with dimensions suitable for use in a watch casing have an inherently low bandwidth, for example between 1 and 2% fractional bandwidth at 2.4 GHz. This is much less than the fractional bandwidths required for many applications, for example 4% for Bluetooth (around 2.45 GHz), 9% for GSM (Global System for Mobile communications, operating from 880 to 960 MHz), and 15% for UMTS (Universal Mobile Telecommunications System, operating from 1900 to 2200 MHz).

SUMMARY OF THE INVENTION

An object of the present invention is to provide an improved antenna for a personal communications apparatus.

According to the present invention there is provided a body-worn personal communications apparatus comprising an antenna and a casing, the casing having disposed within it transceiver circuitry, characterised in that the antenna is a physically-shortened electric antenna and the antenna is mounted transversely to a plane through the casing. Additionally, a microphone can provide a top loading to the antenna.

BRIEF DESCRIPTION OF THE DRAWINGS

Embodiments of the present invention will now be described, by way of example, with reference to the accompanying drawings, wherein.

In the drawings the same reference numerals have been used to indicate corresponding features.

DETAILED DESCRIPTION OF THE PRESENTLY PREFERRED EMBODIMENTS

Figure 1:
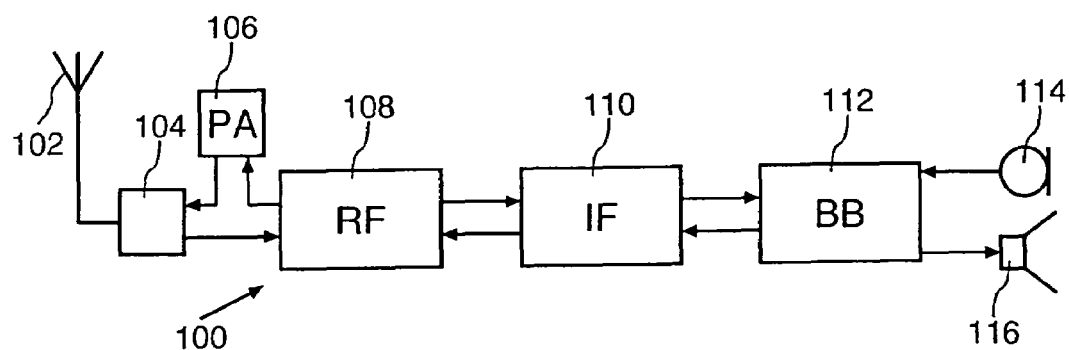
FIG. 1 is a block schematic diagram of a personal communications apparatus.

A block schematic diagram of a personal communications apparatus 100 is shown in FIG. 1. This particular example is based on a GSM cellular telephone, but similar principles apply to other cellular telephony standards and to other personal communications apparatus, for example two-way radio.

Consider first the receiver part of the circuitry operating on a voice telephone call. An antenna 102 receives signals from a remote base station, which signals pass through a diplexer filter 104, the purpose of which is to prevent strong transmitted signals from leaking into and overloading receiver circuitry. The signals then pass into a radio frequency transceiver block (RF) 108, which down-converts the RF signal to a lower intermediate frequency (IF).

The IF signals pass to an intermediate frequency block (IF) 110 which down-converts the IF signal to a baseband signal. This signal then passes to a baseband processing block (BB) 112. This block performs a variety of tasks, including speech decoding, channel decoding and deinterleaving. Received audio signals are converted back to analogue signals for reproduction on a loudspeaker 116 or other suitable output device.

Now consider the transmission side of the circuitry. Voice signals are received by a microphone 114, or other suitable input device, and passed to the baseband processing block 112, where they are converted to digital form. The baseband processing block 112 then encodes the speech and performs channel coding and interleaving to reduce the received bit error rate. The resultant signal for transmission is modulated and passed to the IF block 110. Here the baseband signals are transposed up to an IF frequency.

The IF signal is passed to the RF transceiver block 108 where it is mixed up to the RE transmission frequency and amplified to the required power by a power amplifier (PA) 106. It is then passed through the diplexer filter 104 and transmitted by the antenna 102.

Figure 2:
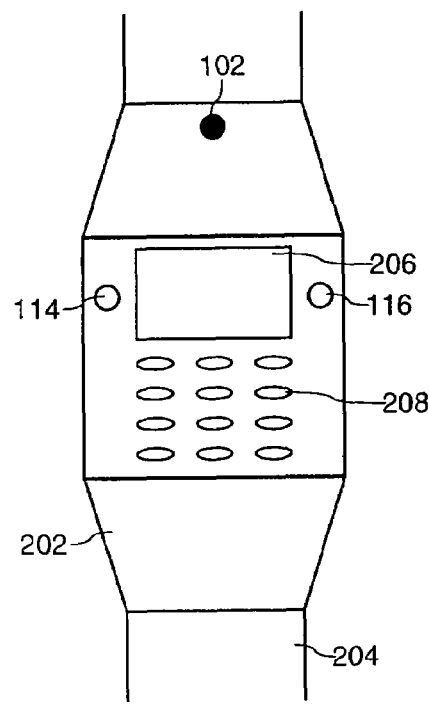
FIG. 2 is a top view of a wrist-carried personal communications apparatus made in accordance with the present invention.
Figure 3:
FIG. 3 is a side view of a wrist-carried personal communications apparatus made in accordance with the present invention.

An embodiment of the present invention will now be described with reference to FIGS. 2 and 3, which are respectively top and side views of a wrist-carried personal communications apparatus 100. The apparatus comprises a casing 202 and a strap 204. A helical antenna 102 is mounted on the casing, with its axis substantially normal to a plane through the casing 202. The majority of the circuitry for the personal communications apparatus is disposed inside the casing 202 and is coupled to the antenna 102. The microphone 114 and loudspeaker 116 are located behind openings in the casing 202. Also provided is a display 206 and a keyboard 208 for controlling the apparatus 100.

It is well-known that electromagnetic waves in the vicinity of a human body are significantly affected by the presence of the body. In particular the magnetic field perpendicular to the body is reduced and that parallel to the body is enhanced relative to their free-space values, by up to 6 dB (see for example *Mobile Antenna Systems Handbook*, K Fujimoto and J R James, Artech House, 1994, pages 178 to 181). This modification is caused by interference between incident and reflected waves. The electric reflection coefficient at an interface is the negative of the magnetic reflection coefficient, hence if a component of magnetic field is reduced (because of destructive interference) the same coefficient of electric field will be enhanced (because of constructive interference). Hence, the electric field parallel to the body is reduced and that perpendicular to the body is enhanced by similar amounts to the changes in magnetic field.

The effect of the body on the magnetic field is taken advantage of in pagers, which typically incorporate a loop antenna arranged to be orthogonal to the user's body in operation and therefore to receive the enhanced parallel component of the magnetic field.

The frequencies used for present and future radio communication systems range from around 900 MHz to 2 GHz and higher. At such frequencies, an antenna 102 which receives the electric field component of an electromagnetic wave is in general significantly more efficient than magnetic loop antennas (for similar antenna dimensions). One such antenna 102 is a helical antenna, comprising one or more conductors wound in a helical shape. A helical antenna has a similar efficiency to a dipole antenna, while being rather more compact.

An antenna suitable for use at GSM at around 900 MHz typically has a diameter of 5 mm and a height of 10 mm. Since the dimensions are related to the wavelength of the electromagnetic waves to be received, at higher frequencies the dimensions of a helical antenna are correspondingly reduced. Hence, it can be seen that the dimensions of a helical antenna 102 make it suitable for use in a GSM wristwatch communicator at 900 MHz, and even more suitable for use in devices operating at higher frequencies.

The transmissions in many radio communication systems have the electric field vertically polarised. When a user is looking at their wristwatch communicator with their arm held out, the face of the communicator will generally be held horizontally. Hence the antenna 102 will be aligned vertically for optimum reception of a vertically polarised transmission. At other times the user's arm will typically be by their side with the result that the antenna 102 will be aligned horizontally, giving rise to significant polarisation mismatch between the antenna 102 and the transmitted signals.

Most radio communication systems operate in an environment having significant levels of multipath signals. In *Radiowave Propagation and Antennas for Personal Communications*, Second Edition, K. Siwiak, Artech House, 1998, pages 209 to 211, it is shown that such signals typically generate a field of opposite polarisation to the transmitted field at a level of about 6 dB below the transmitted field. When combined with the enhancement of the normal component of the electric field by the presence of a human body, the result is that the level of signal received when the communicator is held by the user's side is similar to that received when the communicator is held horizontally in use.

Some additional averaging of performance in different orientations could be provided by a conducting watch casing 202. Since the casing 202 is substantially perpendicular to the axis of the antenna 102 it will have currents induced in it by the opposite polarisation of electric field to that being received by the helical antenna 102. By suitable design of the connection between watch casing 202 and antenna 102 the currents induced in the watch casing can be used to improve the strength of the received signal.

Use of a helical antenna 102 in a wristwatch communicator has a number of advantages over use of other types of antenna. The antenna 102 is not shielded by the watch casing 202 in use, improving efficiency, and operates over a wider bandwidth than patch and loop antennas. In a normal usage position the user's arm held out so that the watch is substantially horizontal and the antenna is substantially vertical. In this position the antenna radiation pattern is substantially omnidirectional in a horizontal plane, providing optimum transmission and reception characteristics.

Figure 4:
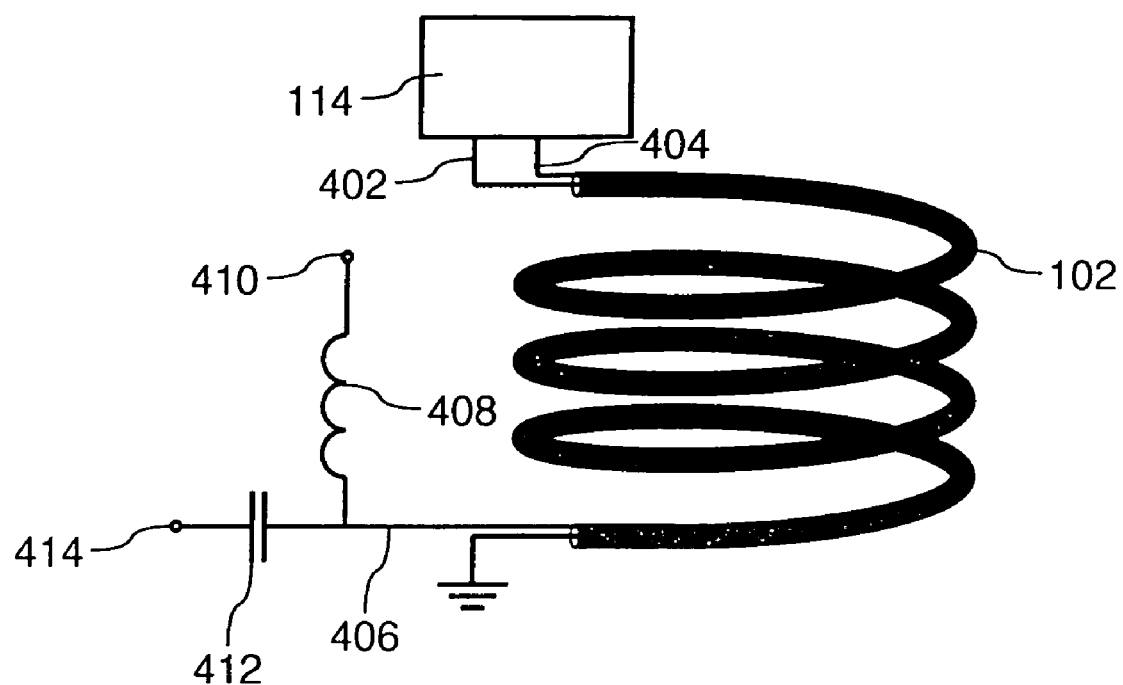
FIG. 4 is a diagram of a helical antenna having an integrated microphone.

A convenient modification of the arrangement described above is to mount the microphone 114 on the top of the antenna 102, as illustrated in FIG. 4. The helical antenna 102 may be formed of coaxial cable, with a connecting wire 402 connecting the microphone 114 to one end of the cable's inner conductor and the other end of the inner conductor being connected to ground. A second connecting wire 404 from the microphone 114 is connected to the cable at the top of the antenna 102. Alternatively, the antenna 102 may be formed from hollow wire through which the first connecting wire is passed to connect the microphone to ground.

At the bottom of the antenna 102 the audio signals from the microphone 114 and the RF signals received or transmitted by the antenna 102 can easily be separated. A shared connection 406 is made to the outer of the coaxial cable (or the hollow antenna wire) at the bottom of the antenna. From this connection audio signals from the microphone are coupled through a low pass filter (shown here as a single inductor 408) to an audio output 410, while the RF signals are coupled through a high pass filter (shown as a single capacitor 412) to an RF output 414.

Other possibilities could be considered for the connections. For example, two connecting wires from the microphone 114 could pass through a hollow antenna wire, eliminating the need for a filter. Alternatively, the connecting wires could be placed through the centre of the helical antenna 102, enabling the antenna to be formed of solid wire.

A particular advantage of locating the microphone 114 at the top of the antenna 102 is that the microphone package provides top loading (increasing the radiation resistance and reducing the capacitive reactance), thereby enabling use of a shorter antenna 102. In an embodiment where the antenna 102 is formed from coaxial cable, if the microphone 114 also presents a low RF impedance it will provide a short circuit at the top of the helical antenna. The transmission line inside the helix is then a short circuit stub, which provides an inductive impedance thereby reducing the capacitive reactance of the antenna 102 and enabling the use of a still shorter antenna 102.

The embodiments of the present invention described above use a helical antenna 102. However, other types of physically-shortened electric antennas could be used instead. Such antennas are monopole or dipole-like antennas that are physically smaller than their electrical length, and receive predominantly the electric field. An example of such an alternative antenna is a meander-line antenna.

Although the embodiments described above relate to a wristwatch telephone, the invention is equally applicable to other body-worn personal communications apparatus. Examples include pendants, worn around the neck, and brooches, which could be worn when not in use and taken off for use.

Further, the present invention is not restricted to use in telecommunications systems such as GSM, DECT (Digital Enhanced Cordless Telecommunications) and UMTS. Other applications may be found in radio-based local area networks, such as those being defined by the Bluetooth and HomeRF organisations, in which a wristwatch communicator could interact with other devices, such as suitably equipped televisions, computers and mobile phones. Applications could also include earpieces or headphones having a wireless connection.

From reading the present disclosure, other modifications will be apparent to persons skilled in the art. Such modifications may involve other features which are already known in the design, manufacture and use of personal communications apparatus and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A body-worn personal communications apparatus comprising:
   A physically-short electric antenna that is physically smaller in at least one dimension than its electrical length in that same dimension;
   A transceiver connected to said physically-short electric antenna;
   A microphone connected to said transceiver; and
   A casing having a width, a length mad a height, said height being less than said width and less than said length,
   Wherein said transceiver is disposed within said casing,
   Wherein said physically-short electric antenna is mounted such that said one dimension of said physically short electric antenna is aligned with said height of said casing,
   Wherein said physically short electric antenna is designed so as to not require manipulation by a user,
   Wherein said a microphone is located at an end of said physically-short electric antenna, the end of said physically-short electric antenna being the end of antenna that is furthest from said casing.

2. The body-worn personal communications apparatus of claim 1, wherein said physically-short electric antenna is a helical antenna.

3. The apparatus of claim 1, wherein said physically-short electric antenna is a meander-line antenna.

4. The apparatus of claim 1, wherein said physically-short electric antenna is formed from a coaxial cable that provides electrical connections between said microphone and said transceiver.

5. The apparatus of claim 1 wherein said physically-short electric antenna is formed from a hollow wire,
   wherein a first electrical connection between said microphone and said transceiver is provided by said hollow wire, and
   wherein a second electrical connection between said microphone and said transceiver is provided by a conductor enclosed by said hollow wire.

6. The apparatus of claim 1, wherein said microphone provides a low impedance at radio frequencies to thereby enable said coaxial cable forming said physically-short electric antenna to act as an inductive stub.

7. The apparatus of claim 1, wherein said microphone provides a top loading to said physically-short electric antenna.

8. A body-worn personal communications apparatus comprising:
   A casing having a width, a length mad a height, said height being less than said width and less than said length;
   A physically-short electric antenna that is physically smaller in at least one dimension than its electrical length in that same dimension; and
   A microphone connected to said transceiver; and
   Wherein said physically-short electric antenna is mounted such that said one dimension of said physically short electric antenna is aligned with said height of said casing,
   Wherein said physically short electric antenna is designed so as to not require manipulation by a user,
   Wherein said a microphone is located at an end of said physically-short electric antenna, the end of said physically-short electric antenna being the end of antenna that is furthest from said casing.

9. The apparatus of claim 8, wherein said physically-short electric antenna is a helical antenna.

10. The apparatus of claim 8, wherein said physically-short electric antenna is a meander-line antenna.

11. The apparatus of claim 8, further comprising:
    a transceiver,
    wherein said physically-short electric antenna is formed from a coaxial cable that provides electrical connection between said microphone and said transceiver.

12. The apparatus of claim 8, wherein said microphone provides a low impedance at radio frequencies to thereby enable said coaxial cable forming said physically-short electric antenna to act as an inductive stub.

13. The apparatus of claim 8, further comprising:
    a transceiver; and
    wherein said physically-short electric antenna is formed from a hollow wire,
    wherein a first electrical connection between said microphone and said transceiver is provided by said hollow wire, and
    wherein a second electrical connection between said microphone and said transceiver is provided by a conductor enclosed by said hollow wire.

14. The apparatus of claim 8, wherein said microphone provides a top loading to said physically-short electric antenna.

* * * * *